3,389,258
SHIELDING ARRAY FOR CHLORINE LOGGING SONDE UTILIZING NEUTRON AND GAMMA RAY SHIELDING ELEMENTS
Dale H. Reed, Henry F. Dunlap, and William C. Pritchett, Dallas, Tex., assignors to Atlantic Richfield Company, a corporation of Pennsylvania
Continuation-in-part of application Ser. No. 209,352, July 12, 1962. This application July 22, 1964, Ser. No. 384,365
3 Claims. (Cl. 250—108)

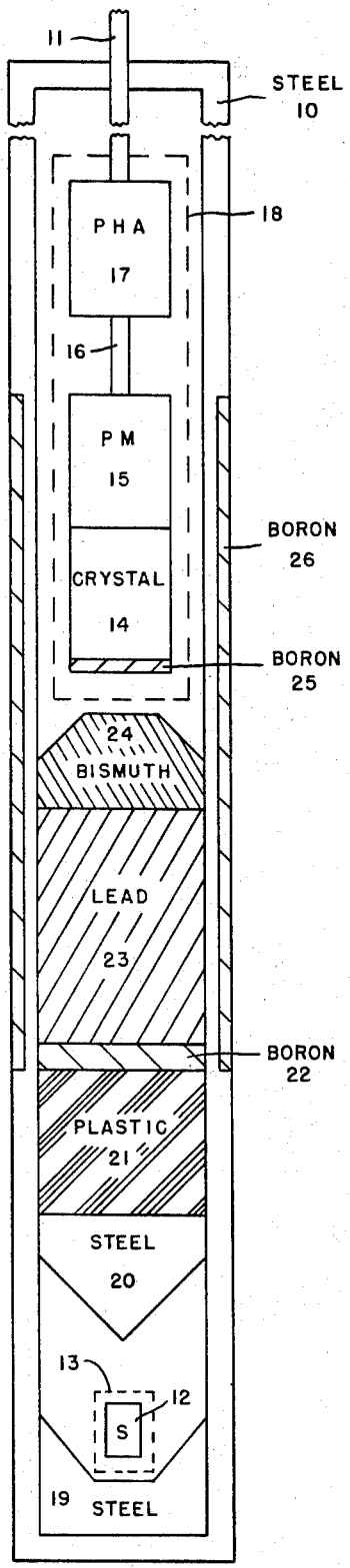

The present invention relates to an improved shielding system for a chlorine logging apparatus. More specifically, the present invention relates to a specific array of different metals arranged to minimize the detection of gamma rays that originate other than from the capture of thermal neutrons in the formation of interest.

This application is a cotninuation-in-part of copending application Ser. No. 209,352, filed July 12, 1962, now U.S. Patent 3,246,157.

Today, numerous combinations and configurations of different metals are used in shielding systems. These systems are designed to solve shielding problems associated with various types of radioactive logging. However, even with the large number of presently available shielding systems, there is no system available to properly shield chlorine logging detectors from borehole effects. In order to appreciate this problem, it is necessary to review the definitions of "chlorine logging" and "borehole effects." The chlorine curve used in chlorine logging operations is produced by bombarding a subsurface formation with fast neutrons and by measuring the formation's response in terms of prompt gamma rays of capture in a given energy range. More specifically, formation fluids and certain elements in the formation moderate the fast neutrons until they reach thermal energy at which time they are subject to capture by various atoms making up the formation. As a result of such captures, gamma rays are emitted and their energies are characteristic of formation elements performing the captures. Since chlorine is a principal capturer because of its large thermal neutron capture cross section, the formation's chlorine content can be determined by logging the count rate of gamma rays with energies characteristic of chlorine. This chlorine content curve, together with a conventional hydrogen content (neutron) curve, recorded separately or simultaneously is conventionally referred to as a chlorine log. The hydrogen content or neutron curve is diagnostic of formation porosity and the chlorine curve is diagnostic of chlorine content. As described in copending application Ser. No. 183,960, owned by a common assignee, the characteristic energy of gamma rays emitted by chlorine is 6 to 6.5 mev., and the most accurate chlorine logging systems use this energy range. The term "borehole effects" refers to the adverse effects produced by well bore fluids, the well casing and cement or mud in the annulus. More specifically, thermal neutron flux established around the source end of the sonde in a manner well known to those skilled in the art results in thermal neutron captures in the neighborhood of the detector. Many of these moderated neutrons are captured by chlorine in the casing fluid, iron in the casing, and calcium in the cement or by various elements in the mud depending on the material in the annulus. On capture of these thermal neutrons, gamma rays in the chlorine energy range are emitted. Since these gamma rays are emitted very close to the detector they have a larger effect on the detected signal than gamma rays emitted at greater distances. In addition, since these gamma rays are not produced by the formation under investigation, the inclusion of such rays in the total count rate produces a false indication of salinity in the formations under investigation.

Presently available shielding systems do not prevent the inclusion of borehole effects in the chlorine curve. Although most systems are successful in preventing many gamma rays from traveling directly between the source and the detector, they either ignore or fail to shield properly against indirect gamma rays and gamma rays produced by borehole effects. The systems that try to shield against these gamma rays use materials inside the sonde in an attempt to absorb the thermal neutrons. With interior shielding, the sonde casing, usually steel or aluminum, increases the borehole effect by capturing thermal neutrons before they reach the inside shielding material.

Accordingly, it is an object of the present invention to provide an improved shielding system for a chlorine logging apparatus.

Another object of the present invention is to provide an improved shielding system that reduces borehole effects.

Another object of the present invention is to provide an improved shielding system that does not interfere with neutrons entering the formation.

Another object of the present invention is to prevent source originating gamma rays from reaching the detector.

Another object of the present invention is to provide an improved shielding system that absorbs thermal neutrons in a manner to produce minimum borehole effects.

Another object of the present invention is to provide a combination of shielding materials that cooperate to reduce to the minimum detection of gamma rays in the chlorine energy spectrum that originate from capturers other than in the formation of interest.

Another object of the present invention is to provide an easy path for fast neutrons from the source to the formation in the vicinity of the detector and a more impeded path from the source directly to the detector.

Another object of the present invention is to provide a means to reduce neutron capture in the lead shielding commonly used in logging devices.

Another object of the present invention is to provide an easy path for gamma rays from the formation to the detector.

Another object of the present invention is to provide a shielding system composed of steel, plastic, lead, boron, and bismuth which component materials are arranged in a predetermined manner.

Other objects and advantages of this invention will become apparent from the following description and the accompanying drawing, wherein:

The drawing illustrates a longitudinal section of the logging sonde showing the improved shielding system.

Sonde 10 is shown supported by an electrical connector 11 and is constructed of steel. Neutron source 12 is housed in a thin wall aluminum can 13 (which for purposes of clarity is indicated by a "dashed" line) and located in an air-filled chamber at the lower end of the sonde. Scintillation crystal 14 is located toward the upper part of sonde 10 and is responsive to prompt capture gamma rays. Photomultiplier tube 15 is adjacent and above crystal 14 and converts scintillations into electrical pulses. Electrical lead 16 passes the electrical pulses to pulse height analyzer 17 located above photomultiplier 15. Vacuum bottle 18 (shown by "dashed" lines for purposes of clarity) contains crystal 14, photomultiplier 15, and pulse height analyzer 17 along with an appropriate cooling system (not shown). Electrical connector 11 connects with pulse height analyzer 17 and conveys the electrical pulses uphole.

Sonde 10 is shown in "broken section" above pulse height analyzer 17 to indicate that other equipment (not shown here) can be located between pulse height analyzer 17 and the top of sonde 10.

The improved shielding system includes steel blocks 19 and 20; plastic material 21; boron shields 22, 25, and 26; lead shield 23; and bismuth shield 24.

Steel block 19 has a concave upper surface adapted to receive neutron source 12. When source 12 is in the position shown, block 19 deflects upward and outward fast neutrons emitted by source 12. Block 19 can be made an integral part of steel sonde 10 where unitary construction is desired.

Steel block 20 is cone-shaped to deflect radiation coming from source 12 out and away from crystal 14. Thus, blocks 19 and 20 cooperate to direct radiation emitted by source 12 toward formations in close proximity to crystal 14.

Steel, i.e., iron, is used for this purpose since the iron nucleus has a large cross section for scattering neutrons and a very high atomic density. Also, iron serves as a good gamma ray shield and serves to prevent gamma rays from passing from source 12 through the sonde to crystal 14.

Plastic shield 21 is composed of hydrogeneous material and moderates high energy neutrons which are not deflected by steel block 20, i.e., those passing upward through the sonde. For this purpose, shield 21 should have a high hydrogen density. Suitable plastics for this purpose include polyethylene, polypropylene, polystyrene, and like materials. Polypropylene is particularly preferred.

Boron plate 22 acts to capture most of the low energy neutrons still proceeding directly upward and thereby reduces neutron captures in lead shield 23 (lead captures yield undesirable high energy gamma rays). Preferably, boron shield 22 is composed of boron carbide in a plastic or rubber binder. However, boron or any boron compound e.g., boron silicide, boral, etc., can be employed.

Lead shield 23 is used primarily to attenuate gamma rays from source 12. The type of radioactive source used determines to a certain extent the thickness of shield 23. That is, more lead is required for a radium beryllium source than a plutonium beryllium source since more gamma rays are generated from the former.

Because of its high density, lead is used very effectively as a gamma ray attenuator. However, on capture of thermal neutrons it does emit high energy gamma rays.

Bismuth shield 24 is positioned above the lead to stop the gamma rays emitted by neutron captures in the upper part of the lead. Additionally, the bismuth shield serves to stop gamma rays from the source.

The bevel on bismith shield 24 favors an angle of approach of gamma rays from neutron capture in the formation but tends to suppress gamma rays coming from inside the borehole.

Wafer 25 which can be made of any material suitable for use in shield 22 is positioned below the crystal as shown. Its purpose is to absorb thermal neutrons that have come up from below the crystal.

Shield 26 can also be made from the aforementioned boron materials. As shown, shield 26 encircles the outside circumference of the sonde and extends from above crystal 14 to approximately adjacent shield 22. Preferably, shield 26 covers the entire detection system, i.e., crystal 14 and photomultiplier 15. Shield 26 affords maximum protection for crystal 14 from neutrons and unwanted gamma rays since thermal neutrons are absorbed by shield 26 before they are captured by casing fluid, the casing, cement, etc. In any event, boron shield 26 greatly reduces the number of thermal neutrons captured by borehole materials and effectively prevents neutrons from being captured by the sonde. It should be observed that shield 26 is made flush with the outside diameter of the sonde to prevent hanging up on casing obstructions and to reduce wear on the shield. In this connection, it may be noted that the present inventors have found that the desired boron substance when embedded in an epoxy resin containing glass provides a particularly wear-resistant outer shield.

The minimum thickness, i.e., longitudinal length, of the various shields can vary according to the type of radioactive source used. The novel structural relationships of the shields shown in the drawing combine to produce an effective shielding for any type of radioactive source when thickness is adjusted for the particular kind of source. Experience has demonstrated that bismuth shield 24 should be on the order of one-third to one-half the size of lead shield 23, i.e., have a longitudinal length about one-third to one-half that of shield 23. Plastic block 21 and steel block 20 should also be on the order of about one-third to one-half the size of lead shield 23. Steel block 19, i.e., the base of sonde 10, can be of any desired thickness; however, usually its over-all size is about one-third to one-half as that for lead shield 23. Boron plates 22 and 25 need only have a longitudinal length about one-tenth to one-twentieth as that for lead shield 23. Boron shield 26 should have as much lateral thickness as possible; therefore, shield 26 will generally be about half as thick as the walls of sonde 10.

By way of specific example, for a 3.8 inch sonde containing a plutonium beryllium source best shielding resultes are obtained where the longitudinal thickness of the interior shields are approximately as follows: shield 24, 2.5 inches; plastic shield 21, 3.0 inches; steel block 20, 2.5 inches; boron plate 22, 0.5 inch; and boron plate 25, 0.1 inch. Boron shield 26 should have a lateral thickness of about 0.1 inch.

Obviously, various modifications can be made in the design of the disclosed shielding system and still come within the broad scope of this invention. For instance, steel block 19 can be made an integral part of sonde 10. For further illustration, boron shield 26 can extend from above crystal 14 to around source 12 so that thermal neutrons emitted by source 12 will be absorbed before they can emit gamma rays. For still further illustration, lead shield 23 can be divided into several component parts which may be adjoining or spaced apart.

It is our intention that the scope of the present invention be only limited by the appended claims.

We claim:

1. A shielding array for a chlorine logging sonde having a neutron source located in an air-filled chamber at the lower end of the sonde and a detector including a scintillation crystal and a photomultiplier tube located above the source comprising
   (a) a steel shield positioned above and in close proximity to said neutron source,
   (b) a plastic shield positioned above and adjacent said steel shield,
   (c) a boron shield positioned above and adjacent said plastic shield,
   (d) a lead shield positioned above and adjacent said boron shield, and
   (e) a bismuth shield positioned above and adjacent said lead shield and below said scintillation crystal.

2. In a shielding array as set forth in claim 1 wherein a second boron shield extends around the outside portion of said sonde opposite said scintillation crystal.

3. In a shielding array as set forth in claim 2 wherein a third boron shield is located above said bismuth shield and below and adjacent said scintillation crystal.

References Cited

UNITED STATES PATENTS

| | | | |
|---|---|---|---|
| 2,769,918 | 11/1956 | Tittle | 250—108 X |
| 2,961,415 | 11/1960 | Axelrad | 250—108 X |
| 3,133,195 | 5/1964 | Jones et al. | 250—108 X |

ARCHIE R. BORCHELT, *Primary Examiner.*